United States Patent [19]

Few

[11] Patent Number: 5,222,754
[45] Date of Patent: Jun. 29, 1993

[54] ADJUSTABLE TENSION SWAY BAR

[75] Inventor: Jeffrey P. Few, West Hills, Calif.

[73] Assignee: Norco Industries, Inc., Compton, Calif.

[21] Appl. No.: 766,269

[22] Filed: Sep. 27, 1991

[51] Int. Cl.⁵ .............................................. B60D 1/16
[52] U.S. Cl. ................................. 280/455.1; 280/457
[58] Field of Search ................. 280/446.1, 455.1, 457, 280/477

[56] References Cited

U.S. PATENT DOCUMENTS

| | | |
|---|---|---|
| 1,123,916 | 1/1915 | Nelson . |
| 1,192,955 | 8/1916 | Thul . |
| 2,952,030 | 9/1960 | Guilbert . |
| 3,273,911 | 9/1966 | Waldie . |
| 3,294,421 | 12/1966 | Mathisen . |
| 3,542,395 | 11/1970 | Millikan . |
| 3,552,771 | 1/1971 | Hendricks . |
| 3,635,496 | 1/1972 | Hedgepeth . |
| 3,730,554 | 5/1973 | Saunders . |
| 3,779,582 | 12/1973 | Hedgepeth . |
| 3,785,680 | 1/1974 | Good . |
| 3,787,077 | 1/1974 | Sanders . |
| 3,825,282 | 7/1974 | Meinholdt . |
| 3,957,286 | 5/1976 | Goodwin . |
| 3,964,767 | 6/1976 | Williams ........................... 280/455.1 |
| 3,989,269 | 11/1976 | Kendessy . |
| 4,003,586 | 1/1977 | Luck . |
| 4,052,085 | 10/1977 | Rendessy . |
| 4,165,885 | 8/1979 | Good . |
| 4,306,734 | 12/1981 | Swanson . |

Primary Examiner—Russell D. Stormer
Assistant Examiner—Joseph D. Pape
Attorney, Agent, or Firm—Fulwider, Patton, Lee & Utecht

[57] ABSTRACT

A trailer stabilizer incorporating an elongated housing rigidly secured on its rear end to a trailer tongue and projecting forwardly coextensive with a friction strap disposed in overlying relationship with respect thereto. Mounted on the interior of the forward extremity of such housing and strap are a pair of friction pads. Sandwiched between such pads is the rear extremity of an elongated friction bar projecting rearwardly from a mount on the towing vehicle trailer hitch. A tensioning control device is mounted on the forward extremity of the housing in overlying relationship with respect to the strap and includes a pusher contacting such strap along its longitudinal center line to urge it toward the opposed wall of the housing to thereby maintain a uniform compressive force on the friction pads. An adjustment screw is provided for periodically adjusting the compressive force maintained by such tensioning control device. In the preferred embodiment, a quick release is provided for releasing the compressive force of the tensioning control device to thereby provide for free movement of the friction bar relative to the friction pads.

19 Claims, 1 Drawing Sheet

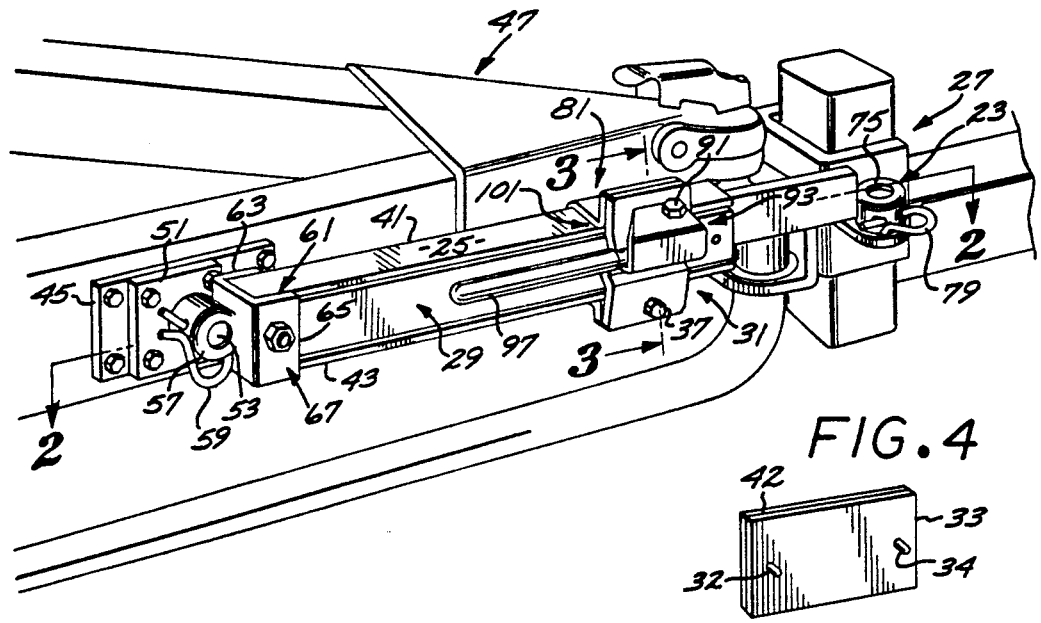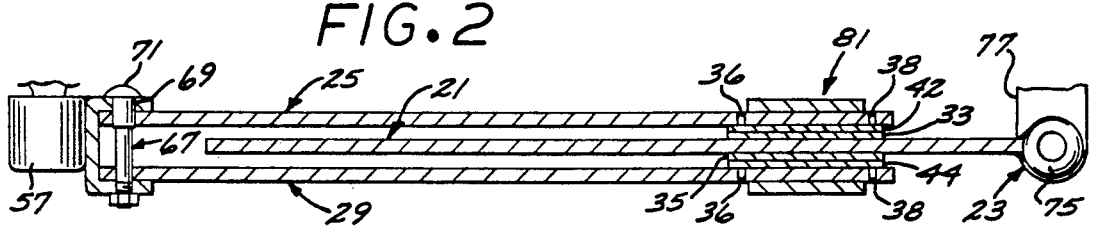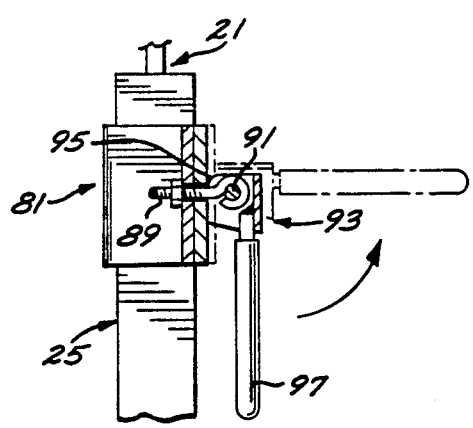

ADJUSTABLE TENSION SWAY BAR

BACKGROUND OF THE INVENTION

1. Field of the Invention

The present invention relates to stabilizing devices for minimizing sway of a trailer relative to a towing vehicle.

2. Description of the Prior Art

The dangers attendant uncontrolled sway of a towed trailer relative to a towing vehicle have long been known. In effort to minimize these dangers, numerous different sway control devices have been proposed. Examples of these sway control devices include those incorporating a circular friction pad mounted on the frame of a trailer acting on a circular post to controllably resist rotation of a lever arm having its free end coupled to the towing hitch. An example of such a device is shown in U.S. Pat. No. 3,273,911 to Waldie. Such devices, while acceptable for their intended purpose, suffer the shortcoming that wear on the friction pad may result in a deterioration in the effectiveness of the sway control resulting in a dangerous condition. This condition may be exacerbated by the false security stemming from the driver's belief that the sway control is operating effectively.

Other efforts to provide reliable sway control have led to the proposal of a flexible cable or belt fitted over a friction shoe mounted on the towing vehicle and having the opposite ends thereof secured to the opposite sides of the trailer frame. A device of this type is shown in U.S. Pat. No. 4,052,085 to Rendessy. Such a device is relatively cumbersome to install and renders fine adjustment thereof relatively difficult and may exhibit shortcomings in reliability.

Other efforts have led to a proposal that friction bars be mounted from the towing vehicles on opposite sides of the trailer frame and telescoped through a friction adjustment arrangement providing for screwing of a bolt in a threaded bore to vary the application of frictional force applied to the respective bars. Such a device, while satisfactory for the intended use, does suffer the shortcoming that the restrictive frictional forces applied to the bars results in application of forces out of alignment with one another, thereby resulting in uneven application of restrictive forces and consequent irregular operation and uneven wear. A device of this type is shown in U.S. Pat. No. 3,552,771 to Hendricks.

In other sway control devices, different adjustment screw arrangements have been proposed for making an adjustment to accommodate for worn friction or brake pads in sway control devices, such adjustments have proven to be relatively unpredictable in maintaining the desired control in the amount of resistance presented to sway of the trailer relative to the vehicle. One difficulty encountered is the fact that friction pads oftentimes wear irregularly across the friction surfaces thereof, thus resulting in an uneven application of resistive forces upon subsequent operation thereof. In other arrangements, the forward and rearward attachment points are unsymmetrical about the longitudinal center line resulting in unequal distribution of forces leading to racking of the device upon operation thereof.

Consequently, there exists a need for a sway control device which will provide for relatively even wear of the friction pads across the surface thereof and an adjustment device to allow for reliable adjustment of the applicator mechanism to maintain a relatively uniform and reliable application of resistance to relative sway of the trailer relative to the towing vehicle. It is desirable that such a device be configured to provide for application of operative forces in a symmetrical pattern relative to the longitudinal center line.

SUMMARY OF THE INVENTION

The sway control apparatus of the present invention is characterized by an elongated friction bar mounted at its forward extremity to the towing vehicle and projecting rearwardly to be sandwiched between a pair of friction pads. The pads are mounted on the respective forward extremities of an elongated housing and friction strap mounted securely at their rear extremities to a mount fitting carried from the trailer frame. An adjustment device is mounted on such housing and includes a pusher for contacting such strap on its longitudinal center line pushing the forward extremity of such strap toward such housing to compress the friction pads against the opposite sides of the friction bar to maintain uniform pressure across the surface of such friction pad. An adjustment screw is provided for adjusting such device as the friction pads wear. The respective mounting points for the rear extremities of the housing and friction strap are spaced equidistant on opposite sides of the friction bar. In a preferred embodiment, a quick release is provided for selectively releasing pressure on such pads.

Other objects and features of the invention will become apparent from consideration of the following description taken in conjunction with the accompany drawing.

BRIEF DESCRIPTION OF THE DRAWINGS

FIG. 1 is a perspective view of a sway control device of the present invention mounted on a trailer;

FIG. 2 is a longitudinal sectional view, in enlarged scale, taken along the line 2—2 of FIG. 1;

FIG. 3 is a vertical sectional view, in enlarged scale, taken along the line 3—3 of FIG. 1;

FIG. 4 is a perspective view, in enlarged scale, of a removable brake pad incorporated in the device shown in FIG. 1; and FIG. 5 is a horizontal sectional view taken along the line 5—5 of FIG. 3.

DESCRIPTION OF THE PREFERRED EMBODIMENT

Referring to FIGS. 1, 2 and 3, the trailer stabilizer apparatus of the present invention includes, generally, an elongated friction bar 21 carried on its forward extremity from a mount 23 and projecting rearwardly to telescope into a channel shaped housing 25 mounted at its rear extremity from a trailer mounting bracket 27. Mounted in overlying relationship on the bar 21 is a friction strap, generally designated 29, which is likewise mounted at its rear extremity from the trailer mounting bracket 27. Referring to FIG. 3, an adjustment device, generally designated 81, is mounted from the housing 25 in overlying relationship relative to a pair of friction pads 33 and 35 mounted on the interior of the respective forward extremities of the housing 25 and friction strap 29 to apply uniform pressure across the surface of such pads. An adjustment bolt 37 is provided for periodically adjusting the pressure on such pads 33 and 35.

In the preferred embodiment, the housing 25 is conveniently constructed from a length of channel which includes an inside wall and upper and lower flanges 41 and 43. The rear end of such housing is conveniently nested in the trailer mounting bracket 61 and the forward extremity cradled in the tensioning device 31 to provide for controllable sliding of the friction bar relative thereto.

Referring to FIG. 1, a rectangular mounting pad 45 is mounted from the frame of the trailer, generally designated 47, and mounts thereon a base plate 51 having a mounting stem 53 projecting therefrom and formed on its distal extremity with a spherical ball defining therebehind a groove (not shown). The mounting bracket 61 is formed with a boss 57 formed with an axial bore for telescoping over the stem 53. Formed in the wall of such boss is a tangentially located small diameter bore for receipt of one leg of a pull pin 59 which securely locks such boss 57 in place. Carried on the front side of such boss 57 is a forwardly opening channel shaped mounting bracket, generally designated 61, defined by forwardly projecting flanges 63 and 65. Received between such flanges is the rear ends of the housing 25 and friction strap 29. Aligned bores are formed in such flanges 63 and 65 as well as in the rearward extremities of the inside wall of the housing 25 and friction strap 29 for receipt of a transverse connector bolt, generally designated 67. The connector bolt 67 is located in the horizontal central plane of the housing 25 and is formed with a serrated shoulder 69 adjacent the head 71. Such shoulder 69 is sized to form an interference fit with the flange 63 and back wall of the housing 25 to thereby provide for a rigid interconnection to positively prevent any play between the housing 25 and bracket 61 to thereby minimize any unrestricted swaying movement of the trailer.

The friction bar 21 is fixed on its forward extremity from a boss 75 which mounts from a bracket 27 carried on the towing vehicle. The boss 75 is formed in the wall thereof with a through tangential small diameter bore for receipt of one leg of a fastener pin 79 (FIG. 1).

Formed in the free extremities of the inside wall of the housing 25 and friction strap 29 are respective longitudinally spaced apart mounting bores 36 and 38 which slidably receive mounting pins 32 and 34 projecting from mounting plates 42 and 44 onto which the confronting surfaces are bonded the respective friction pads 33 and 35.

Referring to FIGS. 1 and 3, the tension adjustment device 31 straddles the forward extremity of the housing 25 and incorporates a quick disconnect, generally designed 93. The tension device 31 is mounted from the housing 25 by means of a channel shaped mounting bracket, generally designated 81, which nests over the housing 25 from the inside thereof and is formed on its top and bottom ends with out-turned feet 83 and 85 formed with respective bores. Mounted in the upper foot 83 is the shank of an eye bolt 89 which carries in the eye thereof a mounting stud 91 projecting from one leg of a bolt (FIG. 3) which spans between the flanges stud spanning a channel shaped cam 94. The free ends of the flanges 96 of such cam 94 terminate in respective cam surfaces 95. Welded to the back wall of such cam 93 is one end of an elongated quick release handle 97. The cam surfaces 95 are configured to cause such cam, when the handle 97 is in the solid line position shown in FIG. 5, to press tightly against the top end of a biasing bar, generally designated 101, which spans the open side of the housing 25 in overlying relationship relative to the friction pads 33 and 35. Referring to FIG. 3, the biasing bar 101 is serpentine shaped in longitudinal cross section to form a generally V-shaped center section defining an apex that acts as a pusher 103 to press against the outside surface of the friction strap 29. Referring to FIGS. 1, 2 and 3, it will be appreciated that the pusher apex 103 extends longitudinally nearly the full length of the friction pads 33 and 35. It contacts the friction strap 29 (FIG. 3) along its longitudinal centerline, in alignment with the extended horizontal plane through the bolt 67 as well as the centerline of the friction pads 33 and 35 to thereby maintain a substantially uniform pressure along the length and width of such pads. The lower extremity of such biasing bar 101 is formed with a bore for receipt of the adjustment bolt 37 such that tightening of such bolt will tighten the tension on the tensioning device 31.

In operation, the trailer stabilizing apparatus of the present invention may be conveniently installed by mounting the mounting pad 45 and base plate 51 on the trailer frame 47 and the towing mount 77 from the towing vehicle. When the quick release handle 97 is in solid line position shown in FIG. 5, the adjustment bolt 37 may be adjusted to cause the pusher apex 103 to apply a predetermined force to the friction strap 29 thus pressing the friction pads 33 and 35 against the friction bar 21 with a predetermined amount of force. It will be appreciated that since the pressure apex 103 contacts the friction strap 29 along its longitudinal center line, such compressive forces will be applied substantially uniformly along the length of the pressure pads 33 and 35 causing the application of uniform pressure to the surfaces thereof.

As the trailer 47 tends to sway relative to the towing vehicle, such swaying movement will be resisted by the frictional resistance between the pads 33 and 35 and the friction bar 21.

It will be appreciated that the mounting points for the back ends of the housing 25 and friction strap 29 to the mounting bracket 61 are spaced equidistant on opposite sides of the extended center line of the friction bar 21. Consequently, the force from the towing vehicle resisting relative movement of the bar 21 relative to such housing and friction strap 29 will be directed along a plane bisecting the distance between the mounting bracket flanges 63 and 65. This generally symmetrical arrangement of mounting points about the extended vertical longitudinal center plane through the friction bar, coupled with application of the compressive force by the pusher apex 103 in the longitudinal horizontal center plane, serves to provide a balanced application of forces action in equal magnitude through the various mounting points to thereby prevent any tendency of those forces to rack the overall apparatus out of its symmetrical orientation.

Additionally, because of the relatively rigid mounting of the housing 25 relative to its mounting bracket 27 due to the interference fit of the shoulder 69 of the mounting bolt 67, there will be substantially no play between such housing and the frame of the trailer 47. This then serves to avoid the parts moving out of alignment from an orientation maintaining symmetry and avoids the well known detrimental effect of play in similar such linkages which allow for the build up of momentum prior to the time when effective sway restrictive forces are applied.

It will be appreciated by those skilled in the art that as the position of the trailer varies relative to the trailer hitch, sway will be resisted due to the fact the pads 33 and 35 carried on the forward extremities of the housing 25 and strap 29 press against the opposite sides of the friction bar 21 as it is drawn forwardly and pushed rearwardly relative thereto. The rear extremity of such bar 21 is constrained within the confines of the channel housing 25 by the compressive action of the pusher apex 103 and boundaries defined by the upper and lower flanges 41 and 43 (FIGS. 1 and 3).

Any time it is desirable to disconnect the trailer 47 from the towing vehicle, convenient and quick release of the tension applied by the stabilizing device may be had by merely rotating the quick release handle 97 counterclockwise, as viewed in FIG. 5, to the broken line released position thus releasing tension on the biasing strap 101 to free the friction bar 21 for free relative movement.

Over time, the friction pads 33 and 35 will experience some wear thus resulting in the forces applied thereto becoming diminished. The adjustment device 31 may then be adjusted bolt 37 to torque the bolt up to the point where the pressure applied to such pressure plates is at the desired level, as for instance 1,000 lbs. This then allows the relatively unskilled operator to make periodic adjustments to be assured that the effectiveness of the trailer stabilizer is maintained.

When the pads 33 and 35 become substantially worn, they can be easily changed by merely removing the tensioning bolt 37 and then removing the retaining pins 59 and 79 and unscrewing the nut from the mounting bolt 67. Such bolt may then be driven from the mounting bracket 61 to thereby free the friction strap 29 and friction bar 21 for removal such that access can be had to the pads 33 and 35. The worn pads 33 and 35 may then be removed and replacement pads inserted to thereby extend the life of the stabilizer apparatus. The apparatus may then be reassembled and the adjustment bolt 37 adjusted to the desired tensions.

From the foregoing it will be apparent to those skilled in the art that the trailer stabilizing apparatus of the present invention provides a sturdy and convenient means for stabilizing sway of a trailer. The device is relatively compact and convenient to install. The device may be easily adjusted for maintaining the desired degree of resistance to sway to thereby provide for safe operation. The life of the apparatus is extended by replacement of the relatively expensive friction pads 33 and 35.

Various modifications and changes may be made with regard to the foregoing detailed description without departing from the spirit of the invention.

What is claimed:

1. A trailer stabilizer apparatus for mounting between a towing vehicle hitch anchor and a trailer frame anchor and comprising:
    towing vehicle hitch and trailer frame mounts for mounting on the respective hitch and trailer anchors;
    a rigid elongated friction bar carried on its front end away from said hitch mount, projecting rearwardly therefrom and formed with first and second sides;
    a laterally extending trailer mounting bracket carried rigidly from said trailer mount and formed with first and second laterally spaced apart forwardly projecting anchor flanges;
    a rigid elongated housing mounted on its rear extremity to said first anchor flange and projecting forwardly along said first side of said bar and coupled in its forward extremity with a first mounting plate confronting said bar;
    a rigid elongated friction strap mounted on its rear extremity to said second anchor flange, projecting forwardly along said second side of said brake bar and coupled at its forward extremity with a second mounting plate confronting said bar;
    a pair of friction pads mounted on the respective plates in lateral alignment with one another and formed with respective confronting friction surfaces of a predetermined area to sandwich said friction bar therebetween;
    a tensioning control device mounted on said housing in overlying relationship with said forward extremity of said friction strap and including a pusher for confronting said strap at a location generally central to said friction surface for applying a compressive force to said strap to urge said friction pads toward one another and maintain a substantially uniform pressure on said friction pads throughout the respective friction surfaces; and
    an adjustment screw coupled with said pusher for periodically adjusting the compressive force applied to said strap to thereby adjust the magnitude of force applied to said friction surfaces.

2. A trailer stabilizer apparatus as set forth in claim 1 wherein:
    said housing is in the form of a channel formed with top and bottom flanges to receive therebetween the respective rear and forward extremities of said bar and strap.

3. A trailer stabilizer apparatus as set forth in claim 1 wherein:
    said first and second anchor flanges include respective aligned bores therethrough, said rear extremities of said housing and strap include respective bores therethrough aligned with the first mentioned bores and said apparatus includes a shoulder bolt received in said bores, said bolt being formed with a shoulder received in press fit relation in said bores formed in said first flange and rear extremity of said housing to hold said housing in positive fixed relationship with respect to said first flange of said trailer mount.

4. A trailer stabilizer apparatus as set forth in claim 1 that includes:
    mounting means for mounting said rear extremity of said housing in positive fixed relation to said bracket.

5. A trailer stabilizer apparatus as set forth in claim 1 wherein:
    said tensioning control device includes a quick release mounted on said housing and operative to release the tension applied by said device.

6. A trailer stabilizer apparatus as set forth in claim 1 wherein:
    said tensioning control device includes an elongated biasing bar connected on one end to the top of said housing, projecting downwardly over said strap and being configured in cross section with a V-shape with the apex thereof defining said pusher and then secured on its bottom end to the bottom side of said housing.

7. A trailer stabilizer apparatus as set forth in claim 1 wherein:
    said tension control device includes an elongated biasing bar spanning said housing, configured medially to form said pusher and connected on its top end to the top side of said housing, said adjustment bolt connecting the bottom end thereof to the bottom side of said housing.

8. A trailer stabilizer apparatus as set forth in claim 1 that includes:

removable pad mount means for removably mounting said pads from said pad mounts and operable to provide for periodic removal and replacement of said pads.

9. A trailer stabilizer apparatus as set forth in claim 3 wherein:

said shoulder of said shoulder bolt is fluted.

10. A trailer stabilizer apparatus as set forth in claim 5 wherein:

said quick release includes a cam rotatably mounted on said housing and formed with a cam surface engaging said friction strap, said cam surface being configured such that positioning thereof in a first position serves to press said strap toward said housing to apply said compressive force to said friction pads and upon rotation thereof to a second position to release the force on said strap, said quick release further including a handle carried on one end from said cam and projecting therefrom to be grasped by an operator to rotate said cam from said first to said second position.

11. A trailer stabilizing apparatus comprising:

a tow mount;

an elongated rigid friction bar carried on its forward extremity away from said tow mount, projecting rearwardly therefrom and formed with oppositely facing first and second sides;

a trailer bracket;

an elongated rigid housing mounted fixedly on its rear extremity on said trailer mount at a first attachment point and projecting forwardly therefrom along said one side of said bar and coupled on its forward extremity with a first mounting plate;

an elongated rigid friction strap mounted on its rear extremity, relative to said bracket at a second attachment point, and projecting forwardly therefrom an coupled on its forward extremity with a second mounting plate;

a pair of friction pads mounted on the respective mounting plates disposed in lateral alignment with one another;

a tensioning control device mounted on said housing and including a pusher contacting said friction strap at a location compressing said pads against the opposite sides of said bar to apply a substantially uniform pressure along the length of the respective pads;

a pad adjustment device including a threaded bolt for adjusting the pressure applied to said pads; and said bar, housing and strap being so configured and arranged as to locate said bar in a plane perpendicular to a line between said first and second attachment points and equidistant between said point to cause forces applied to said bar and strap to act in respective planes located equidistant form the longitudinal center line of said bar.

12. A trailer stabilizing apparatus according to claim 11 wherein:

said housing is in the form of a channel formed with top and bottom flanges to receive therebetween the respective rear and forward extremities of said bar and strap.

13. A trailer stabilizing apparatus according to claim 11 wherein:

said trailer bracket includes laterally spaced apart first and second anchor flanges including respective aligned bores therethrough, said rear extremities of said housing and strap include respective bores therethrough aligned with the first mentioned bores and said apparatus includes a shoulder bolt received in said bores, said bolt being formed with a shoulder received in press fit relation in the bores formed in said first flange and rear extremity of said housing to hold said housing in positive fixed relationship with respect to said first flange of said trailer mount.

14. A trailer stabilizing apparatus according to claim 11 that includes:

mounting means for mounting said rear extremity of said housing in positive fixed relation to said bracket.

15. A trailer stabilizing apparatus according to claim 11 wherein:

said tensioning control device includes a quick release mounted on said housing and operative to release the tension applied by said device.

16. A trailer stabilizing apparatus according to claim 11 wherein:

said tensioning control device includes an elongated spring bar connected on one end to the top of said housing, projecting downwardly over said strap and being configured in cross section with a V-shape with the apex thereof defining said pusher and then occurred on its bottom end to the bottom side of said housing.

17. A trailer stabilizing apparatus according to claim 11 that includes:

removable pad mount means for removably mounting said pads from said pad mounts and operable to provide for periodic removal and replacement of said pads.

18. A trailer stabilizing apparatus according to claim 13 wherein:

said shoulder of said shoulder bolt is fluted.

19. A trailer stabilizing apparatus according to claim 15 wherein:

said quick release includes a cam rotatably mounted relative to said housing and formed with a cam surface engaging said friction strap, said cam surface being configured such that positioning thereof in a first position serves to press said strap toward said housing to apply said compressive force to said friction pads and upon rotation thereof to a second position to release the force on said strap, said quick release further including a handle carried on one end from said cam and projecting therefrom to be grasped by an operator to rotate said cam from said first to said second position.

* * * * *

UNITED STATES PATENT AND TRADEMARK OFFICE
CERTIFICATE OF CORRECTION

PATENT NO. : 5,222,754
DATED : June 29, 1993
INVENTOR(S) : Jeffrey P. Few

It is certified that error appears in the above-identified patent and that said Letters Patent is hereby corrected as shown below:

Column 5, line 19, after "adjusted" insert --by merely applying a standard torque wrench to the adjustment--;

Column 6, line 14, delete "confronting" and insert --contacting--.

Signed and Sealed this

First Day of February, 1994

Attest:

BRUCE LEHMAN

Attesting Officer

Commissioner of Patents and Trademarks